(12) United States Patent
Carl

(10) Patent No.: US 11,954,541 B1
(45) Date of Patent: Apr. 9, 2024

(54) HIGHLY AVAILABLE MESSAGE INGESTION BY A DATA INTAKE AND QUERY SYSTEM

(71) Applicant: Splunk Inc., San Francisco, CA (US)

(72) Inventor: Craig Keith Carl, Seattle, WA (US)

(73) Assignee: Splunk Inc., San Francisco, CA (US)

( * ) Notice: Subject to any disclaimer, the term of this patent is extended or adjusted under 35 U.S.C. 154(b) by 2 days.

(21) Appl. No.: 17/588,074

(22) Filed: Jan. 28, 2022

(51) Int. Cl.
*G06F 9/54* (2006.01)

(52) U.S. Cl.
CPC .................... *G06F 9/546* (2013.01)

(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2010/0332456 A1* | 12/2010 | Prahlad | G06F 16/1748 713/160 |
| 2012/0072608 A1* | 3/2012 | Peters | H04L 65/612 709/231 |
| 2015/0180891 A1* | 6/2015 | Seward | H04L 63/1416 726/22 |
| 2015/0295779 A1* | 10/2015 | Ching | H04L 43/022 715/733 |
| 2017/0223030 A1* | 8/2017 | Merza | H04L 63/1416 |
| 2018/0089269 A1* | 3/2018 | Pal | G06F 16/24542 |
| 2018/0102938 A1* | 4/2018 | Yoon | G06F 16/358 |
| 2019/0098106 A1 | 3/2019 | Mungel et al. | |
| 2019/0138639 A1* | 5/2019 | Pal | G06F 16/27 |
| 2020/0082015 A1* | 3/2020 | Watts | G06F 16/9024 |

OTHER PUBLICATIONS

Splunk Enterprise 8.0.0 Overview, available online, retrieved May 20, 2020 from docs.splunk.com.
(Continued)

*Primary Examiner* — Charles E Anya
(74) *Attorney, Agent, or Firm* — Nicholson De Vos Webster & Elliott LLP

(57) ABSTRACT

Techniques are described for providing a highly available data ingestion system for ingesting machine data sent from remote data sources across potentially unreliable networks. To provide for highly available delivery of such data, a data intake and query system provides users with redundant sets of ingestion endpoints to which messages sent from users' computing environments can be delivered to the data intake and query system. Users' data sources, or data forwarding components configured to obtain and send data from one or more data sources, are then configured to encapsulate obtained machine data into discrete messages and to send copies of each message to two or more of the ingestion endpoints provisioned for a user. The ingestion endpoints receiving the messages implement a deduplication technique and provide only one copy of each message to a subsequent processing component (e.g., to an indexing subsystem for event generation, event indexing, etc.).

20 Claims, 9 Drawing Sheets

(56) References Cited

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carasso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
MacCarthaigh, Colm, "Shuffle Sharding: Massive and Magical Fault Isolation," AWS Architecture Blog, Apr. 14, 2014, retrieved from Internet: https://aws.amazon.com/blogs/architecture/shuffle-sharding-massive-and-magical-fault-isolation/, 5 pages.
MacCarthaigh, Colm, "Workload isolation using shuffle-sharding," Amazon Builder's Library, retrieved from \ Internet: https://aws.amazon.com/builders-library/workload-isolation-using-shuffle-sharding/ on Jan. 24, 2022, 9 pages.

\* cited by examiner

500

---

Receiving, by an ingestion endpoint of a data intake and query system, a message associated with a data source located in a computing environment, wherein the message includes machine data reflecting activity of a computing resource in the computing environment, and wherein a copy of the message is received by at least one other ingestion endpoint of a plurality of ingestion endpoints
502

↓

Requesting to store the message or an identifier of the message in a data store, wherein the request to store the message or the identifier of the message in the data store succeeds if the message or the identifier of the message does not exist in the data store
504

↓

Responsive to determining that the message or the identifier of the message was successfully stored in the data store, causing the message to be processed by a data intake and query system
506

FIG. 5

HIGHLY AVAILABLE MESSAGE INGESTION BY A DATA INTAKE AND QUERY SYSTEM

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Data intake and query systems enable users to search, monitor, and analyze many different types of machine-generated data. To enable these and other features, a data intake and query system typically includes components to help with capturing, indexing, and correlating data in a searchable repository, from which graphs, reports, alerts, dashboards, and other visualizations can be generated. To ingest data into a data intake and query system, users can use different types of data forwarding components, application programming interface (API) based endpoints, or other mechanisms provided by the data intake and query system.

BRIEF DESCRIPTION OF THE DRAWINGS

Illustrative examples are described in detail below with reference to the following figures:

FIG. 5 is a flow diagram illustrating operations of a method for providing highly data ingestion by a data intake and query system according to some examples.

DETAILED DESCRIPTION

The present disclosure relates to methods, apparatus, systems, and non-transitory computer-readable storage media for providing a highly available data ingestion system for ingesting machine data sent from remote data sources across potentially unreliable networks. For example, among other use cases, the techniques described herein can be used by a data intake and query system to more reliably ingest machine data sent from data sources in users' computing environments across the public internet to data ingestion endpoints running on cloud provider-based resources or in any other type of remote network. Existing techniques for ingesting machine data originating from remote data sources remain susceptible to data loss due to occasional network congestion, network device failures, and the like. For example, data sent from a data source in a user's computing environment to a single designated ingestion endpoint can be lost if there are any unexpected issues with the ingestion endpoint or with any network component in the network path between the two. Some systems might implement failover processes to mitigate endpoint outages and other issues, where data sources can be configured to resend failed messages to newly launched backup endpoints if needed. However, these failover processes can introduce undesirable latency into ingestion pipelines and can also be overly resource intensive for only sporadic message delivery failures.

To address these and other issues, in examples described herein, a data intake and query system provides users with redundant sets of ingestion endpoints to which messages sent from users' computing environments can be delivered to the data intake and query system. Data sources in users' computing environments, or data forwarding components configured to obtain and send data from one or more data sources, are then configured to encapsulate obtained machine data into messages and to send copies of each message to two or more of the ingestion endpoints provisioned for a user. In some examples, the ingestion endpoints receiving the messages implement a deduplication technique (e.g., using a shared message queue or other type of shared data store) and provide only a single copy of each message to a subsequent processing component (e.g., to an indexing subsystem of a data intake and query system for event generation, event indexing, etc.). The use of multiple ingestion endpoints provides redundancy in the target data intake and query system to better tolerate messages lost in transit and to better enable the system to scale a number of ingestion endpoints as users' ingestion demands changes over time, among other benefits.

Figure 1:
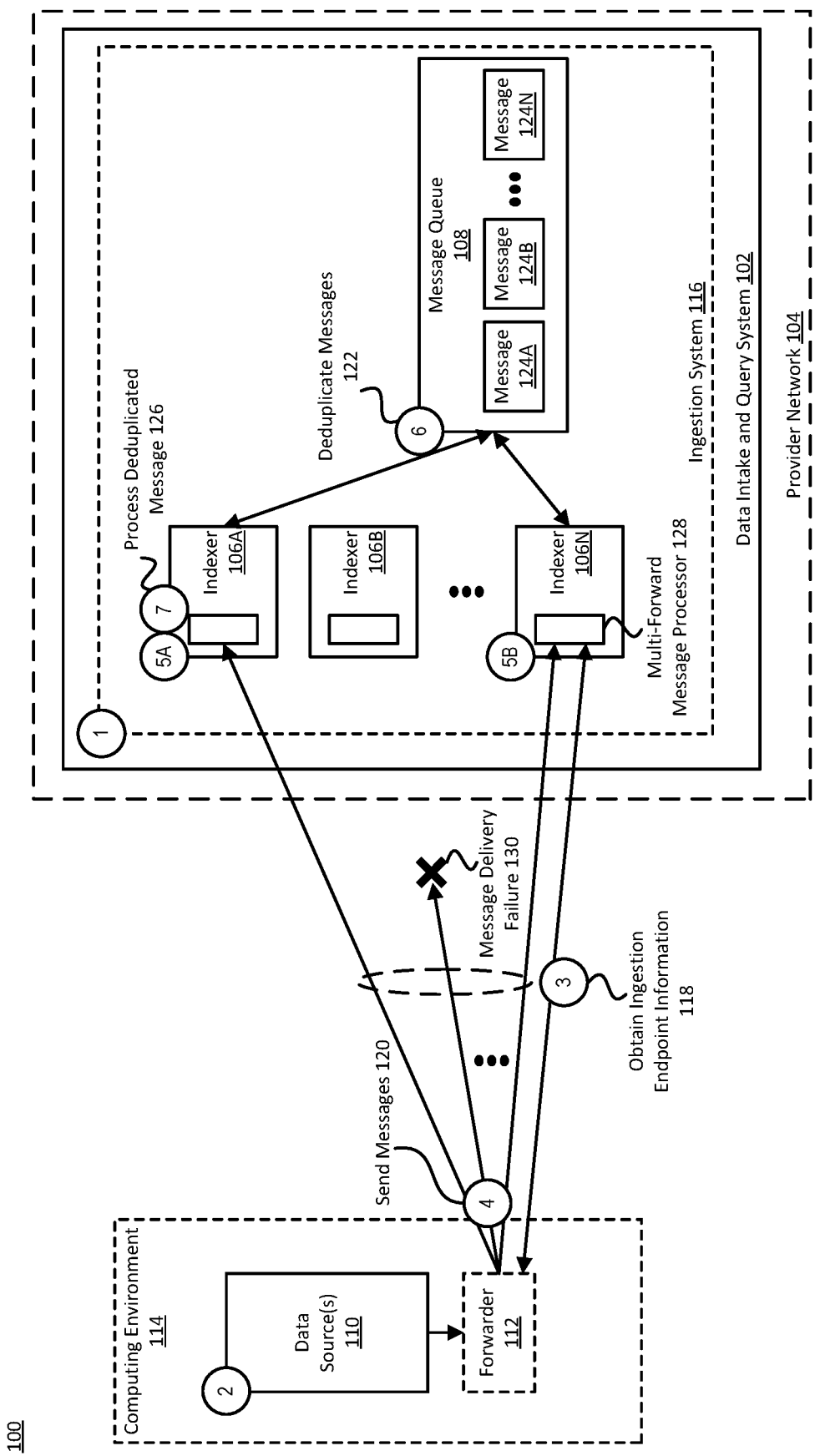
FIG. 1 is a diagram illustrating an environment in which a data source, or an associated data forwarding component, in a user's computing environment sends messages containing machine data to a redundant set of ingestion endpoints provisioned for the user by a data intake and query system according to some examples.

FIG. 1 is a diagram illustrating an environment in which a data source, or an associated data forwarding component, in a user's computing environment sends messages containing machine data to a redundant set of ingestion endpoints provisioned for the user by a data intake and query system according to some examples. As shown, the environment 100 includes a data intake and query system 102 that operates in a cloud-based provider network 104 where, for example, the various components (e.g., indexer 106A, indexer 106B, . . . , indexer 106N, and message queue 108) execute using hardware- and software-based resource computing resources provided by various services of the cloud-based provider network 104 (e.g., by a hardware virtualization service, container services, networking services, message queue services, and the like). In other examples, the data intake and query system 102 can operate within an entity's own computing environment, e.g., in an entity's own datacenter.

In FIG. 1, a data source 110 broadly represents any component of a computing device that produces machine data such as, e.g., a server, a networking device, an application, an Internet of Things (IoT) device, etc. The data source can include hardware components, software components, or combinations thereof. A user desiring to analyze data related to the operation or security of a computing environment can configure one or more of such data sources 110, or configure data forwarding components configured to obtain machine data from data sources (e.g., a forwarder 112), to send machine data from a user's computing environment 114 to a data intake and query system 102 to enable the user to search, analyze, and visualize the data as desired. As described in more detail elsewhere herein, sending data to the data intake and query system 102 can enable an entity, for example, to search, analyze, and visualize the data, where such analyses can be used to administer a computing environment 114, to detect security issues, to understand how the computing environment is performing, among many other possible uses. Although only a single data source 110 is shown in FIG. 1 for illustrative purposes, a computing environment 114 can include any number of such data sources, some or all of which can be configured to send data to a data intake and query system 102 as described herein.

In some examples, at the circle labeled "1" in FIG. 1, a data intake and query system 102 provisions for an entity an ingestion system 116 including a set (or "cluster") of ingestion endpoints (e.g., shown as part of indexers 106A, 106B, . . . , 106N in FIG. 1) and a shared message queue 108. The data intake and query system can provision the ingestion system 116 for an entity automatically, e.g., based on a user creating an account with the data intake and query system 102, based on a user providing input indicating a desire to ingest data into the data intake and query system 102, as part of the default installation or execution of the data intake and query system 102, or based on any other conditions. For example, a user can generally administer the operation of a data intake and query system 102 using a computing device that can access the data intake and query system 102 through a user interface (e.g., a web-based console provided by the data intake and query system, a terminal, etc.) to configure data ingestion settings among other configurations.

In some examples, the data intake and query system 102 initially provisions a default number of ingestion endpoints for a user desiring to send data to the data intake and query system 102. A data intake and query system 102 can provision an ingestion endpoint, for example, by launching computing resources (e.g., VMs, containers, applications, networking resources, storage resources, etc.) using one or more web services provided by a provider network 104 or other system. In some examples, the provisioning of the ingestion system 116 can be based at least in part on user configurations indicating information about how the user intends to use the data intake and query system 102. For example, the input from a user can include an indication of a number of data sources the user has or intends to configure to send data to the data intake and query system 102, an expected volume of data to be sent to the data intake and query system 102 from the user's data sources, an amount of redundancy that a user desires for messages sent to the data intake and query system 102, a cost expectation for the user, and the like. In some examples, based on such input, the data intake and query system 102 can initially provision a certain number of ingestion endpoints for the user (e.g., such that the data intake and query system 102 may provision more destination indexers for a user with higher expected resource and redundancy needs compared to a user with lower expected resource and redundancy needs).

In some examples, the data intake and query system 102 can also dynamically and automatically scale the number of ingestion endpoints based on changes to the total workload over time. Scaling signals can include, but are not limited to, an amount of available CPU, memory, network bandwidth, and storage resources on currently provisioned ingestion endpoints, an amount of time between copies of a same message being received by two or more respective ingestion endpoints, a total count of messages received by ingestion endpoints over one or more periods of time, etc. The scaling of ingestion endpoints can include adding additional indexers (e.g., horizontally scaling a set of ingestion endpoints), scaling an amount of computing resources available to a set of ingestion endpoints (e.g., vertically scaling the ingestion endpoints by increasing/decreasing an amount of available CPU, memory, network bandwidth, storage, etc.), or combinations thereof.

In this context, an ingestion endpoint broadly represents a potential destination for messages sent from a data source (or from an associated data forwarding component) located in a user's computing environment for ingestion by the data intake and query system 102. In FIG. 1, the example ingestion endpoints are shown as a component of indexers launched by the data intake and query system 102 (e.g., including indexer 106A, indexer 106B, . . . , indexer 106N). For example, the ingestion endpoints can be implemented at least in part by a multi-forward message processor component executing in connection with indexers (e.g., the multi-forward message processor 128 of the indexer 106N). In some examples, the multi-forward message processor component can include control plane and data plane functionality to enable configuration of multi-forward message processing in addition to data plane processing of messages received from data sources. In other examples, the control plane and data plane functionality can be implemented as separate components and optionally operate on separate computing resources. As described in more detail elsewhere herein, in some examples, an indexer is also a data indexing component responsible for coordinating and performing indexing operations on machine data and events received by the data intake and query system 102. In other examples, an ingestion endpoint can be a component that is separate from one or more indexers or other components used to perform event generation and indexing on machine data received by an ingestion endpoint.

In some examples, set of ingestion endpoints provisioned for a user optionally includes a "controller" endpoint responsible for managing the set of ingestion endpoints provisioned for a user and for providing information to data sources about ingestion endpoints available to the data sources. In other examples, any given ingestion endpoint can act as a controller endpoint, or a separate endpoint of the data intake and query system 102 can act as a source of information about the set of provisioned ingestion endpoints for a data source or entity. An ingestion endpoint can be associated with one or more identifiers used to identify and to address a particular endpoint, e.g., when a data source is attempting to send data to the endpoint. These one or more identifiers of an ingestion endpoint can include, for example, an ingestion endpoint label, a unique Internet Protocol (IP) address, a Domain Name System (DNS) name, and the like.

At circle "2" in FIG. 1, in some examples, a data source 110, or associated data forwarding component 112, in a user's computing environment is configured to obtain machine data from one or more components in a computing environment 114 and to send messages including the obtained machine data to the data intake and query system 102. As described in more detail elsewhere herein, a data forwarding component, or forwarder 112, is generally any process that sends data from a data source 110 to an indexer or other ingestion endpoint of a data intake and query system 102. In some examples, a forwarder 112 can obtain and send the machine data largely unprocessed or, in other examples, can perform some processing on the data before sending the data to the data intake and query system 102. Although the examples provided herein include the optional use of a forwarder 112, other methods of sending data from a data source to its provisioned ingestion endpoints are possible, and references to sending data from a data source to the data intake and query system 102 include any such possible mechanisms.

In some examples, the data source 110 or forwarder 112 encapsulates machine data obtained from the computing environment into discrete messages for delivery to the data intake and query system 102. A message generated by a data source can include, for example, the machine data to be included into the message, metadata about the message (e.g., an identifier of the data source from which the machine data was obtained, a type of the machine data, other details about the data source such as, e.g., an IP address or other identifier, etc., a timestamp, an indication of a message data format, etc.), a unique hash of the message and message metadata (e.g., a SHA-256 hash), and the like. As indicated, in some examples, the data source 110 or forwarder 112 optionally performs some event generation processes on the machine data including, for example, identifying discrete pieces of machine data used to represent individual events, associating each event with a timestamp, among other possible operations.

At circle "3" in FIG. 1, in some examples, the data source 110 or forwarder 112 obtains a list of ingestion endpoints available to the data source from the data intake and query system 102. In the example shown in FIG. 1, the forwarder 112 obtains ingestion endpoint information 118 from an indexer 106N. In this example, the indexer 106N may be acting as a designated controller endpoint responsible for maintaining information about the collection of ingestion endpoints provisioned for the data source 110 or more generally for an associated user. As indicated, in other examples, any of the indexers 106A, 106B, . . . , 106N can act as a controller endpoint capable of providing such information, or the information may be obtained from an entirely separate endpoint or component. In some examples, a data source 110 or forwarder 112 can be configured with information used to access an endpoint capable of providing the ingestion endpoint information 118 based on a static identifier (e.g., an IP address or hostname at which the endpoint is accessible coded into the data source or forwarder), based on user configuration of the data source 110 or forwarder 112 to refer to a particular IP address or hostname, based on obtaining an identifier of the controller endpoint from another management service of the data intake and query system 102, or from any other such source. A data source 110 or forwarder 112 can obtain the ingestion endpoint information 118 prior to sending messages to the data intake and query system 102 and can obtain updates to the ingestion endpoint information periodically over time (e.g., by periodically querying the data intake and query system 102 for any updates, by receiving updates from the data intake and query system 102 responsive to detected changes to the ingestion system 116, etc.).

In some examples, a request from a data source 110 or forwarder 112 to obtain ingestion endpoint information can include authentication information used to identify an account associated with the data source or forwarder (e.g., an account created with the data intake and query system). For example, an identifier of the account with which a data source 110 or forwarder 112 is associated can be used to identify a particular set of ingestion endpoints configured that account, where any number of separate ingestion endpoints collections can be configured for any number of separate accounts of the data intake and query system 102 at any given time. In other examples, different sets of ingestion endpoints can be provisioned for different collections of data sources within a user's computing environment 114 or for data sources distributed across multiple separate computing environments. For example, an identifier of the data source 110 or forwarder 112 requesting the ingestion endpoint information can be used to identify a set of ingestion endpoints accessible to that particular data source, where some data sources within a computing environment 114 may have access to different sets of endpoints relative to other data sources. In some examples, each ingestion endpoint of a set of ingestion endpoints provisioned for any entity can be configured to ingest data from only one or more particular data sources or from only data sources associated with one or more specified types of data. In these examples and others, each data source 110 or forwarder 112 within a user's computing environment 114 may be provided with a same or different set of ingestion endpoints for that data source depending on the data sources' individual characteristics.

As indicated above, a data source 110 or forwarder 112 can periodically or continuously generate messages containing machine data obtained from a source in a computing environment 114. Once a message is generated, at circle "4" in FIG. 1, in some examples, the data source 110 or forwarder 112 sends 120 duplicate copies of the message to two or more ingestion endpoints identified by the ingestion endpoint information 118 (e.g., where each message can be addressed using a distinct IP address or DNS name for each respective endpoint). In some examples, the messages are sent using HTTP/3 over QUIC or other network protocol established between the data source 110 or forwarder 112 and ingestion endpoints. In some examples, the data source 110 or forwarder 112 can send copies of a message to all available ingestion endpoints identified by the obtained ingestion endpoint information 118, to a subset of the available ingestion endpoints (e.g., the data source 110 or forwarder 112 may be configured to send messages to at least four of six available ingestion endpoints or any other percentage of the total number of available endpoints), to only ingestion endpoints matching one or more characteristics (e.g., to only ingestion endpoints configured to ingest a type of machine data associated with the message, to a greater percentage of the available ingestion endpoints during periods of relatively high traffic volume and a lesser percentage during periods of relatively low traffic volume, during certain ingestion endpoints during particular times of day, etc.). In some examples, the messages can be sent across one or more intermediate networks between the computing environment 114 and provider network 104 (e.g., including the public internet) generally using any of type of network transmission protocol, application programming interface (API) calls, etc.

In the example of FIG. 1, a copy of a sent message is successfully delivered to ingestion endpoints associated with at least an indexer 106A and an indexer 106N. One copy of the message destined for an ingestion endpoint associated with indexer 106B experienced a message delivery failure 130 due to, for example, network congestion, an operational issue with one or more intermediary networking devices, an operational issue with indexer 106B, or the like. As described in more detail herein, the message delivery failure 130 does not result in the loss of the data to be ingested by the data intake and query system 102 due to the successful delivery of copies of the message to at least the redundant ingestion endpoints associated with indexer 106A and indexer 106N. As this illustrates, the redundant delivery of messages to multiple ingestion endpoints enables successful processing of the data by the data intake and query system 102 so long as at least one copy of a message is received by any ingestion endpoint of a provisioned ingestion system 116. Furthermore, failover processes can be performed relative to indexer 106B, or indexer 106B can be repaired, without the need for the data source(s) 110 or forwarder 112 to resend the messages.

As indicated, any number of ingestion endpoints of an ingestion system 116 may receive a same copy of a message sent from a data source or forwarder in a redundant fashion. However, the data intake and query system 102 generally is designed to process only one copy of each message for the purposes of event generation, event indexing, or other processes used to make the corresponding data available for search and analysis. Thus, in some examples, the ingestion system 116 implements deduplication processes to ensure that only a single copy of each message is forwarded to downstream processing components of the data intake and query system 102.

At the circles labeled "5A" and "5B" in FIG. 1, in some examples, the ingestion endpoints receiving a message copy from a data source 110 or forwarder 112 (e.g., an ingestion endpoint associated with indexer 106A in this example) attempts to store its received copy of the message (or store a hash value or other unique identifier derived from the message) in a data store. In some examples, the data store (e.g., a message queue 108) is used to deduplicate 122 two or more copies of a same message received by two or more ingestion endpoints of the ingestion system 116. In this example, ingestion endpoints associated with each of indexer 106A and indexer 106N receives a respective copy of a message at various points in time depending on an amount of time taken for each copy of the message to travel from the data source 110 or forwarder 112 to the respective ingestion endpoint.

In some examples, the message queue 108 or other shared data store used to deduplicate messages received by the ingestion system 116 is configured to successfully store one unique copy of each message or message identifier requested for storage. For example, if a same message is received by each of indexers 106A and 106N at various points in time, and indexer 106A attempts to store the message or message identifier in the message queue 108 prior to any other indexer, the store operation succeeds and the indexer 106A is notified as such. Conversely, attempts to store a copy of a message already present in the message queue are denied and the message may optionally be discarded. For example, if indexer 106N attempts to store a same copy of the message already stored in the message queue 108 by indexer 106A, the message queue 108 can deny the request and indicate to the indexer 106N that the message already exists in the queue. Thus, each of the messages 124A, 124B, ..., 124N represent unique messages received from one or more data source(s) 110. Other types of deduplication techniques can be used in other examples to ensure that only one copy of each message sent from a data source is retained for further processing, including the possibility of using quorum-based techniques.

In some examples, if an ingestion endpoint is able to store a copy of the message or message identifier in the message queue 108, the message is forwarded to a processing component. At circle "7" in FIG. 1, for example, because indexer 106A is able to successfully store its copy of the message in the message queue 108, the message is forwarded to processing component for event generation and event indexing for use by the data intake and query system 102 (e.g., shown as process deduplicated message 126). In this example, the processing component is part of the indexer 106A; in other examples, the processing component can be part of a separate component relative to the ingestion endpoint. In some examples, an ingestion endpoint can retain a copy of each message until it receives confirmation that the message is successfully received by a downstream processing component and can retry sending messages to a downstream processing component if no such confirmation is received.

As indicated, in some examples, some or all ingestion endpoints of a provisioned ingestion system 116 can be optionally associated with one or more specified types of machine data each ingestion endpoint is configured to receive. In this example, the ingestion endpoint information 118 received by a data source 110 can include identifiers of type(s) of machine data each available ingestion endpoint is configured to receive. A data source can then send machine data to appropriate ingestion endpoints accordingly. For example, if the ingestion endpoint information 118 indicates that only three of the indexers 106A, 106B, ..., 106N are configured to ingest a particular type of log data, a data source 110 or forwarder 112 can send messages containing the particular type of log data to only those selected ingestion endpoints and send messages containing other types of machine data to other indexers.

Figure 2:
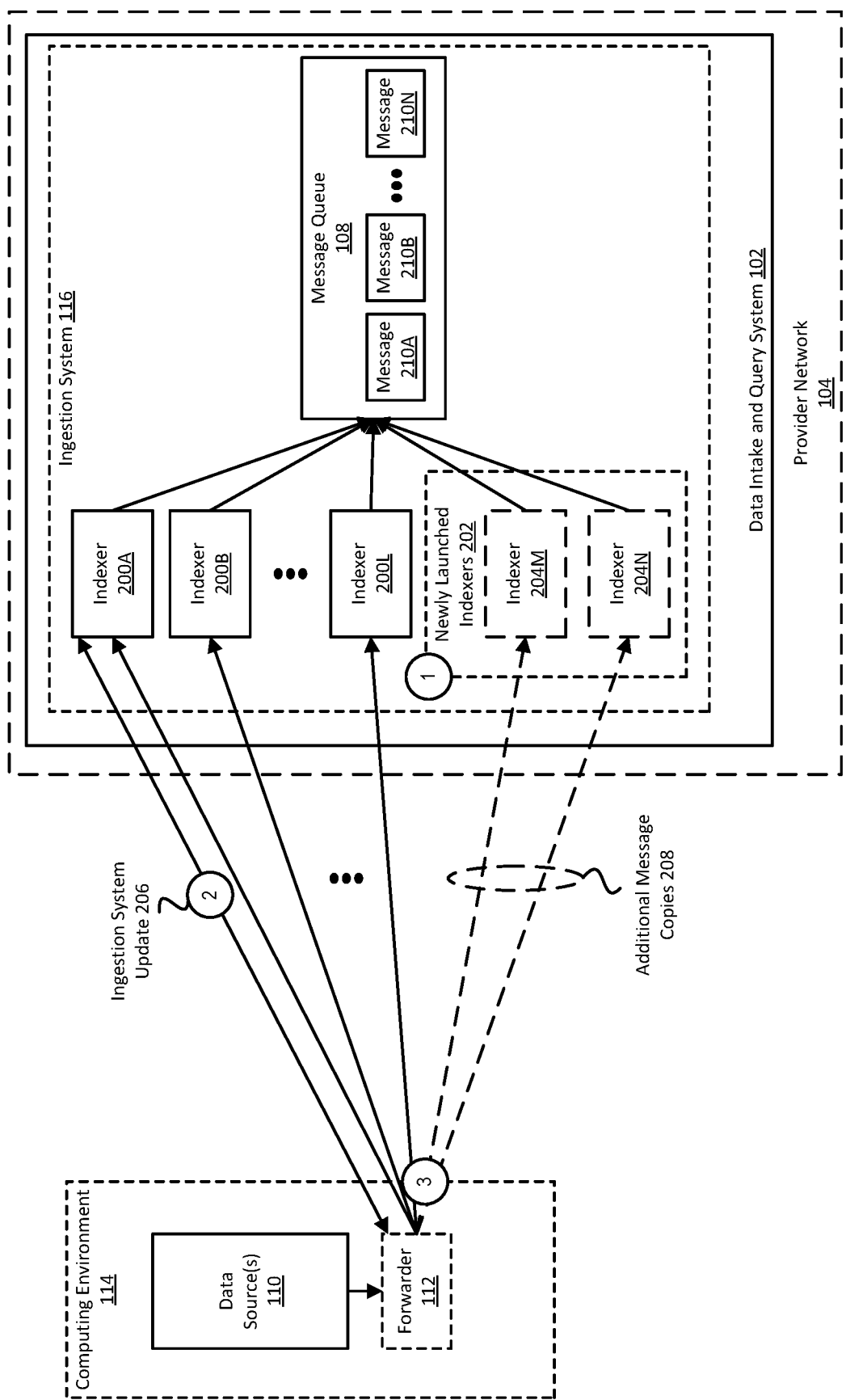
FIG. 2 is a diagram illustrating the ability to scale a redundant set of ingestion endpoints responsive to changes in data ingestion conditions according to some examples.

In some examples, a set of ingestion endpoints provisioned for a user or computing environment can be scaled (e.g., additional endpoints added or removed) depending on various detected conditions such as, e.g., incoming message volume, network conditions, operational issues with any existing ingestion endpoints, and the like. FIG. 2 is a diagram illustrating the scaling of a redundant set of ingestion endpoints responsive to changes in data ingestion conditions according to some examples.

As shown in FIG. 2, a set of ingestion endpoints associated with indexers 200A, 200B, ..., 200L are initially provisioned for a user desiring to ingest data from the computing environment 114. At some point in time, as indicated by circle "1" in FIG. 2, a determination is made to scale the initially provisioned set of ingestion endpoints. As indicated above, a data intake and query system can make a scaling determination based on an analysis of incoming message volume (e.g., detecting a change in a total number of messages received from data source(s) 110 or forwarder 112 over a period of time), changes to network conditions (e.g., as measured by a data source 110, forwarder 112, or a component of the data intake and query system 102), detected operational issues with an existing set of ingestion endpoints (e.g., based on a determination that one or more of the ingestion endpoints have failed or are operating in a degraded manner), and so forth. In some examples, responsive to detecting one or more of such conditions, the data intake and query system 102 can launch one or more additional indexers (e.g., newly launched indexers 202 including an indexer 204M and indexer 204N) providing a data source 110 or forwarder 112 with additional possible ingestion endpoints for messages to be sent to the data intake and query system 102. Similarly, responsive to other conditions, a data intake and query system 102 can scale down the number of ingestion endpoints in a given ingestion system 116 (e.g., responsive to detecting a decrease in message volume, detecting an improvement in network conditions, etc.) by terminating execution of one or more indexers.

At circle "2" in FIG. 2, a data source 110 or forwarder 112 can periodically obtain information indicating changes to the set of ingestion endpoints such as those described above caused by detected ingestion endpoint operational issues or ingestion system scaling. In some examples, a data source 110 or forwarder 112 obtains updates to ingestion endpoint information responsive to defined events (e.g., responsive to a data source receiving an error code upon sending a message to an unavailable ingestion endpoint, responsive to the data intake and query system 102 scaling set of ingestion endpoints up or down, etc.). In general, a data source or forwarder can obtain an ingestion system update 206 from an ingestion endpoint, from a separate management endpoint of the data intake and query system 102, or other sources as described herein in relation to obtaining the ingestion system information initially. The ingestion system update 206 information can identify, for example, additional available ingestion endpoints, changes to existing ingestion endpoints (e.g., changes to accepted types of machine data, ingestion schedules, etc.), or other relevant information.

At circle "3" in FIG. 2, the data source 110 or forwarder 112 is now configured, based on the obtained ingestion system update 206 information, to send copies of messages to both the initial ingestion endpoints and additionally send message copies 208 to the endpoints associated with the newly launched indexers 202. As indicated above, in other examples, a data source or forwarder can be configured to send messages to fewer or different ingestion endpoints based on an ingestion system update depending on the type of scaling that occurred. Similar to FIG. 1, the set of ingestion endpoints in FIG. 2 can use the shared message queue 108 to deduplicate the received messages (e.g., shown as deduplicated messages 210A, 210B, ..., 210N) for subsequent processing by the data intake and query system 102.

Figure 3:
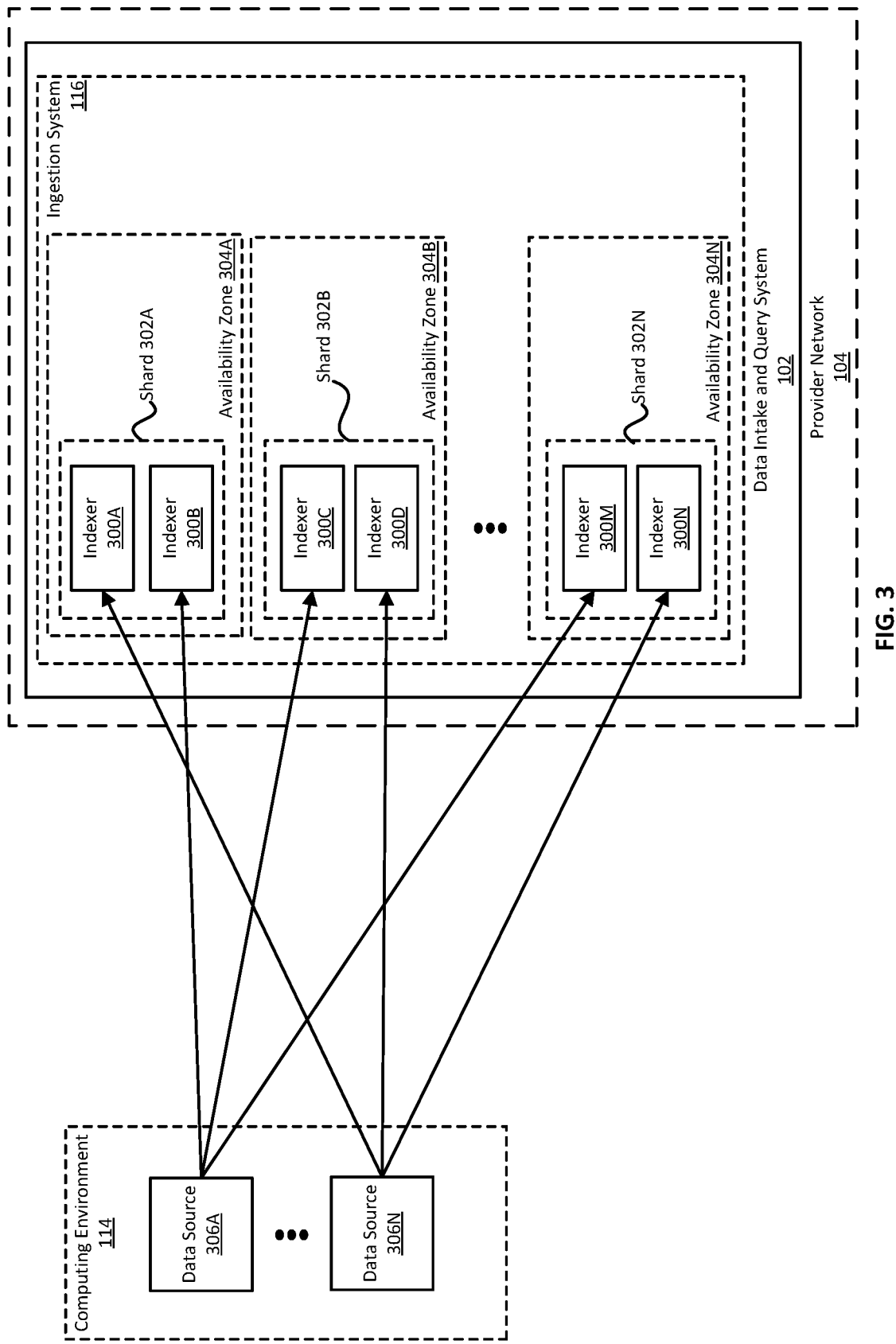
FIG. 3 is a diagram illustrating the sharding of a set of ingestion endpoints for additional redundancy according to some examples.

In some examples, a set of ingestion endpoints of an ingestion system can be sharded into one or more ingestion endpoint groups for additional redundancy. FIG. 3 is a diagram illustrating the sharding of a set of ingestion endpoints into ingestion endpoint groups for additional redundancy according to some examples. As shown in FIG. 3, a set of ingestion endpoints associated with indexers 300A, 300B, 300C, 300D, ..., 300M, and 300N are sharded into multiple separate shards including a shard 302A, shard 302B, and shard 302N. The sharding of the ingestion endpoints represents a partitioning of the endpoints that enables incoming messages to be balanced across the shards and to enable additional fault tolerance among the shards, among other benefits. For example, a shard can correspond to a distinct failure domain that may be exposed to an increased risk of simultaneous failure within the same failure domain but protected in many cases from failures occurring in other distinct failure domains. As shown in FIG. 3, in some examples, these failure domains can correspond to separate availability zones 304A, 304B, ..., 304N or other types of failure domains provided by a provider network 104.

In some examples, the data intake and query system 102 can shard a set of available ingestion endpoints such that the endpoints are evenly balanced across shards, based on distributing endpoints associated with different ingested data types, or based on any other balancing criteria. In some examples, the data intake and query system 102 can redistribute endpoints among a set of shards over time based on changing numbers of available endpoints or any other ingestion system conditions. Furthermore, in some examples, the data intake and query system 102 can add or remove a total number of shards based on changes to a total number of available endpoints, changes to a desired amount of redundancy, etc. In some examples, the data intake and query system 102 stores data identifying the shards and ingestion endpoints assigned to each shard as metadata about the ingestion system 116.

In some examples, the information about available ingestion endpoints can include identifiers of a shard to which each endpoint is assigned (e.g., ingestion system information identifying an ingestion endpoint associated with indexer 300A can further include an identifier of the shard 302A). In some examples, a data source (e.g., one of data sources 306A, ..., 306N) can then be configured to send a copy of a message to at least one ingestion endpoint associated with each available shard. For example, given a message to be sent to the data intake and query system 102, a data source or forwarder can randomly select one or more ingestion endpoints from each shard as destinations for the message or can use ingestion endpoints in each shard in a round-robin manner for consecutive messages sent. In some examples, a data intake and query system can strive to ensure that at least one ingestion endpoint associated with a shard is available at all times when scaling ingestion endpoints or otherwise ensuring the overall health of ingestion endpoints.

As indicated, the data intake and query system 102 can create ingestion endpoints shards in part relative to a set of defined availability zones of a cloud provider network. For example, each of shards 302A, 302B, ..., and 302N can be implemented using computing resources that are launched in separate availability zones, where each availability zone includes logically separate infrastructure with redundant and separate power such that failures in one availability zone are unlikely to affect resources in another availability zone. In some examples, the availability zones can include availability zones specifically requested by a user associated with the ingestion system 116 or based on a default set of availability zones selected by the data intake and query system 102.

In some examples, a data intake and query system 102 can configure shards and the ingestion endpoints to which particular data sources send messages using a shuffle sharding technique. In general, a data intake and query system 102 can enable shuffle sharding by randomly or otherwise assigning ingestion endpoints to shards, where two or more shards can contain the same ingestion endpoint. Several different types of shuffle sharding are possible, such as stateless or stateful shuffle sharding, each of which increases the compartmentalization of failures and "noisy neighbors" to reduce the impact of such events on the system as a whole. Furthermore, multiple different sets of ingestion endpoints (sometimes referred to as "receiver sets") can be provisioned across availability zones to add further redundancy into the system.

Figure 4:
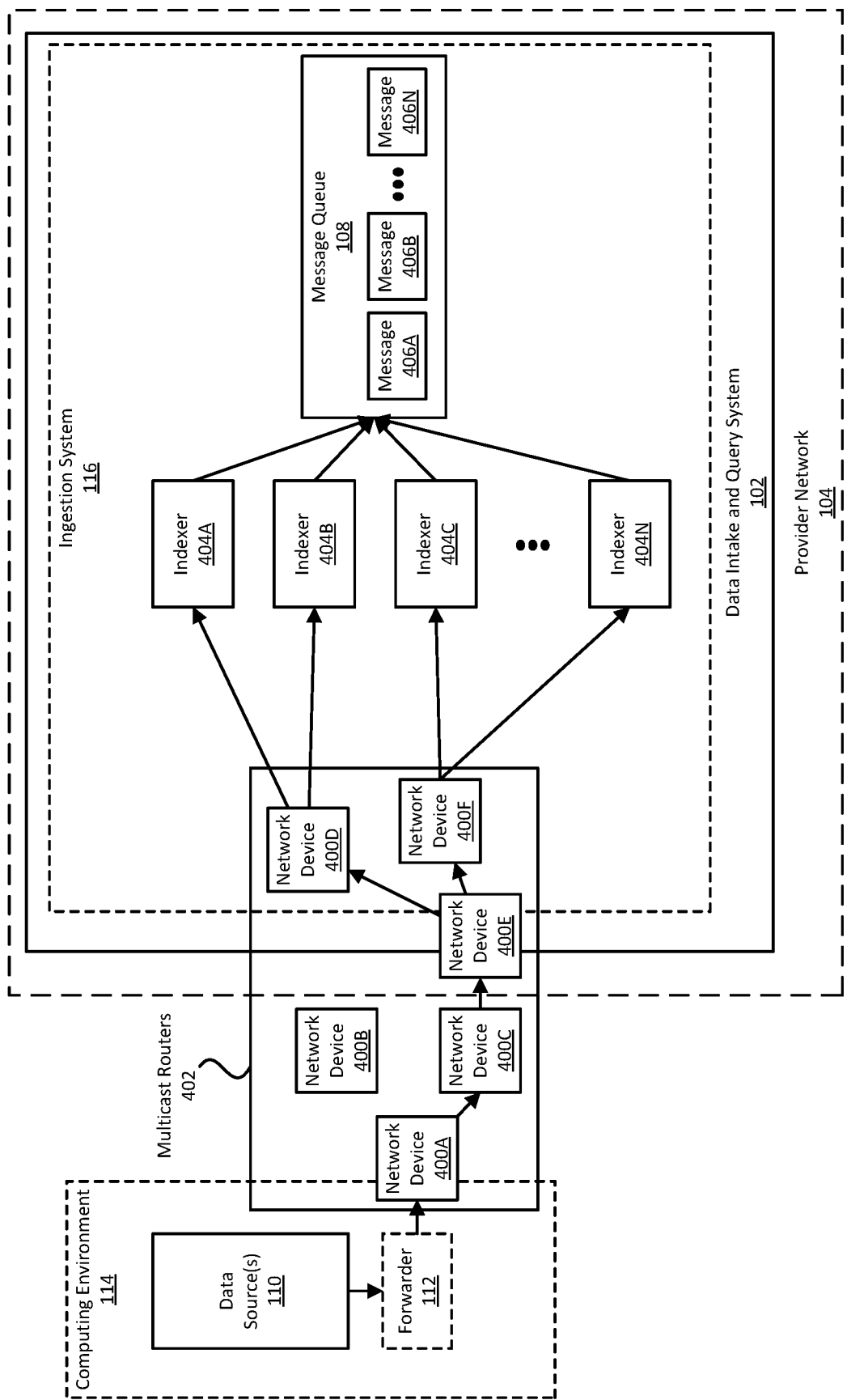
FIG. 4 is a diagram illustrating the delivery of messages to multiple ingestion endpoints using a multicast-based network protocol according to some examples.

FIG. 4 is a diagram illustrating the delivery of messages to multiple ingestion endpoints using a multicast-based network protocol according to some examples. In some examples, a multicast network protocol is used to enable a data source to send messages to a single endpoint, where the endpoint broadcasts the messages to each of a plurality of ingestion endpoints. As shown in FIG. 4, in some examples, a data source 110 or forwarder 112 can be configured to send messages that are broadcast to multiple ingestion endpoints using a multicast data transmission protocol. In this example, a collection of network devices 400A-400F identified as multicast routers 402 are configured to automatically create copies of messages for delivery to a collection of ingestion endpoints (e.g., ingestion endpoints associated with indexers 404A, 404B, 404C, ..., 404N) using a multicast-based network protocol. The multicast routers 402 can use any of several multicast protocols including, for example, pragmatic general multicast (PGM), protocol independent multicast (PIM), or the like.

Similar to the examples described above, the redundant set of indexers 404A, 404B, 404C, . . . , 404N can use the message queue 108 to deduplicate the messages (shown as messages 406A, 406B, . . . , 406N) received from one or more data source(s) 110. In some examples, the multicast routers 402 can receives updates over time from the data intake and query system 102 indicating a set of ingestion endpoints to which messages from a data source or forwarder are to be broadcasted, e.g., where such updates can reflect changes to the set of available ingestion endpoints as described herein.

Although many of the examples described herein pertain to the ingestion of machine-generated data by a data intake and query system, the described techniques for providing highly available message ingestion systems can also be applied to other use cases. For example, similar techniques can be used by systems responsible for receiving and processing emails, instant messages, data transfers (e.g., data sent from a mobile device to a cloud-based storage service), general data interchange between businesses, and the like. In the example of an email system, the ingestion endpoints can be incorporated into or otherwise coupled to mail servers, and client devices sending emails can be configured to send copies of each email to a plurality of email ingestion endpoints instead of a single email server. In each of these examples, similar deduplication techniques can be used to deduplicate copies of received emails, data transfers, or more generally messages encapsulating any type of data.

FIG. 5 is a flowchart illustrating an example process 500 for providing highly data ingestion by a data intake and query system. The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively or additionally, the process 500 can be implemented using a non-transitory computer-readable medium storing instructions that, when executed by one or more processors, case the one or more processors to perform the operations of the process 500 of FIG. 5.

The process 500 includes, at block 502, receiving, by an ingestion endpoint of a data intake and query system executing, a message associated with a data source located in a computing environment, wherein the message includes machine data reflecting activity of a computing resource in the computing environment, and wherein a copy of the message is received by at least one other ingestion endpoint of a plurality of ingestion endpoints.

In some examples, the message is sent by a data forwarding component installed in the computing environment, wherein the data forwarding component generates the message by storing as part of the message: machine data, a timestamp, and a hash value calculated based on at least a portion of the message.

In some examples, each ingestion endpoint of the plurality of ingestion endpoints is associated with a unique Internet Protocol (IP) address or Domain Name System (DNS) name, and wherein the data source sends the message to the ingestion endpoint using the unique IP address or DNS name of the ingestion endpoint. In some examples, copies of the message are generated by a networking device using a multicast-based network protocol.

In some examples, the ingestion endpoint is associated with a type of machine data supported by the ingestion endpoint, and wherein the data source sends the message to the ingestion endpoint based at least in part on a determination that the machine data is associated with the type of machine data supported by the ingestion endpoint.

The process 500 further includes, at block 504, requesting to store the message or an identifier of the message in a data store, wherein the request to store the message or the identifier of the message in the data store succeeds if the message or the identifier of the message does not exist in the data store. In some examples, the data store is a message queue that preserves an ordering of the messages based on a timestamp associated with each message.

The process 500 further includes, at block 506, responsive to determining that the message or the identifier of the message was successfully stored in the data store, causing the message to be processed by a data intake and query system. In some examples, causing the message to be processed by the data intake and query system includes generating an event based on the machine data contained in the message and indexing the event. In some examples, the ingestion endpoint is part of an indexer of the data intake and query system, and wherein the indexer processes the message in part by generating an event based on the machine data contained in the message and indexing the event.

In some examples, the ingestion endpoint is a first ingestion endpoint, and wherein the method further comprises: receiving, by a second ingestion endpoint, a copy of the message including the machine data; requesting, by the second ingestion endpoint to store the copy of the message or an identifier of the message in the data store; and responsive to determining that the data store denied storage of the copy of the message or the identifier of the message, causing the second ingestion endpoint to discard the copy of the message.

In some examples, the process further includes determining that a change has occurred to the plurality of ingestion endpoints, wherein the change includes at least one of: removal of an ingestion endpoint from the plurality of ingestion endpoints, addition of an ingestion endpoint to the plurality of ingestion endpoints, reassignment of an ingestion endpoint of the plurality of ingestion endpoints to a shard of a plurality of shards, or modification of a type of machine data supported by an ingestion endpoint of the plurality of ingestion endpoints; and providing, to the data source, updated ingestion endpoint information indicating the change to the plurality of ingestion endpoints.

In some examples, the process further includes sending, to the data source, identifiers of the plurality of ingestion endpoints, wherein the plurality of ingestion endpoints are provisioned for a user account associated with the data source.

In some examples, the process further includes: receiving, from the data source, a request for information about the plurality of ingestion endpoints, wherein the request includes authentication information identifying a user account associated with the data source; identifying the plurality of ingestion endpoints based at least in part on the authentication information; and sending, to the data source, information identifying the plurality of ingestion endpoints.

In some examples, the process further includes grouping the plurality of ingestion endpoints into a plurality of shards, wherein the data source sends a copy of the message to at least one ingestion endpoint associated with each shard of the plurality of shards. In some examples, the process further includes comprising grouping the plurality of ingestion endpoints into a plurality of shards, wherein the plurality of shards are distributed across two or more availability zones of a cloud provider network.

In some examples, the process further includes provisioning, by the data intake and query system, the plurality of ingestion endpoints in association with an account of the data intake and query system, wherein the data source is associated with the account of the data intake and query system.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
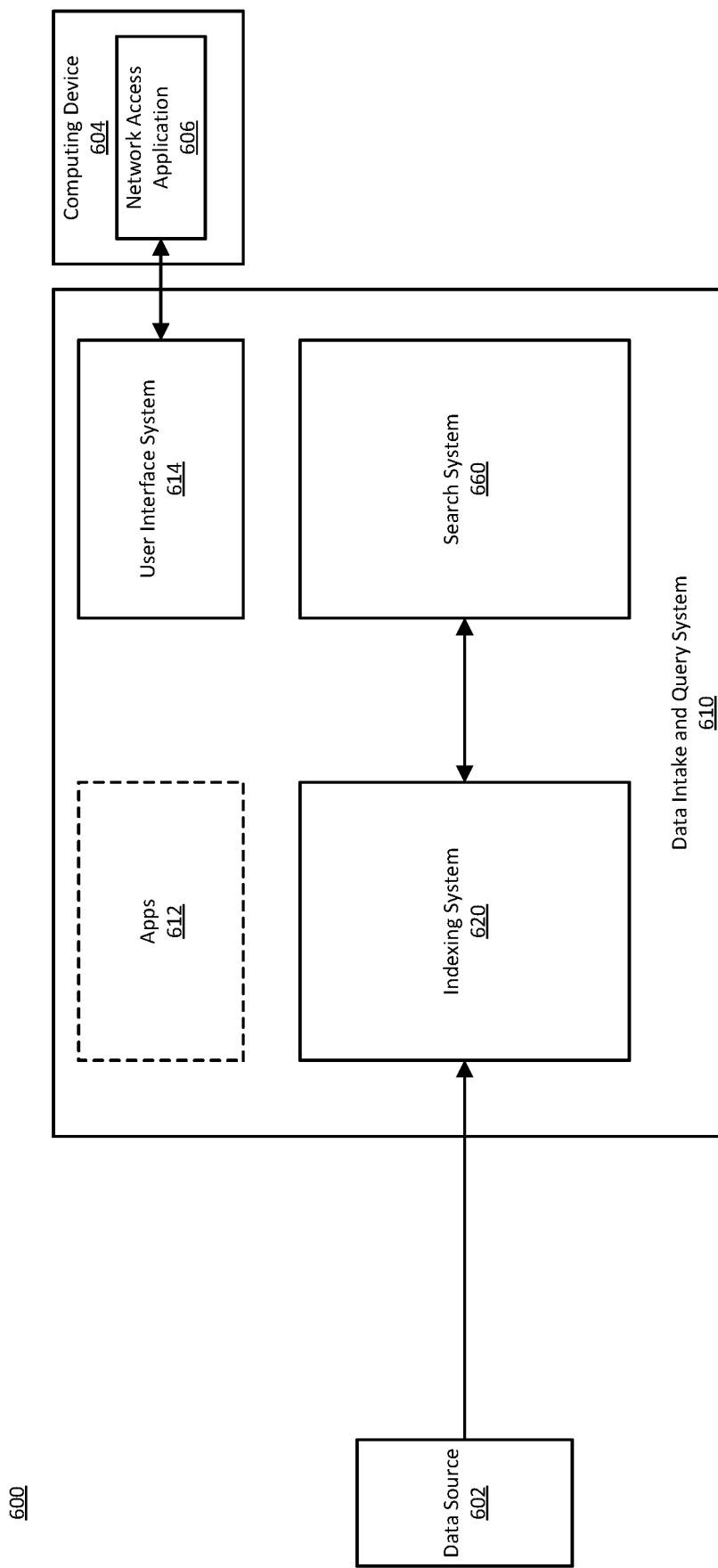
FIG. 6 is a block diagram illustrating an example computing environment that includes a data intake and query system according to some examples.

FIG. 6 is a block diagram illustrating an example computing environment 600 that includes a data intake and query system 610. The data intake and query system 610 obtains data from a data source 602 in the computing environment 600, and ingests the data using an indexing system 620. A search system 660 of the data intake and query system 610 enables users to navigate the indexed data. Though drawn with separate boxes, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can execute on a single computing device, or may be distributed over multiple computing devices. For example, the program code can include instructions for executing both indexing and search components (which may be part of the indexing system 620 and/or the search system 660, respectively), and can be executed on a computing device that also provides the data source 602. As another example, the program code can execute on one computing device, where the program code executes both indexing and search components, while another copy of the program code executes on a second computing device that provides the data source 602. As another example, the program code can execute only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples).

The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine data from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing system 620. As discussed in greater detail below, the search system 660 enables users associated with the computing environment 600 (and possibly also other users) to navigate the data, generate reports, and visualize results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries to the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, which can a network interface of the client computing device 604 to communicate, over a network, with the user interface system 614 of the data intake and query system 610. The user interface system 614 can use the network access application 606 to generate user interfaces that enable a user to interact with the data intake and query system 610. A web browser is one example of a network access application. A shell tool can also be used as a network access application. In some examples, the data intake and query system 610 is an application executing on the computing device 604. In such examples, the network access application 606 can access the user interface system 614 without needed to go over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
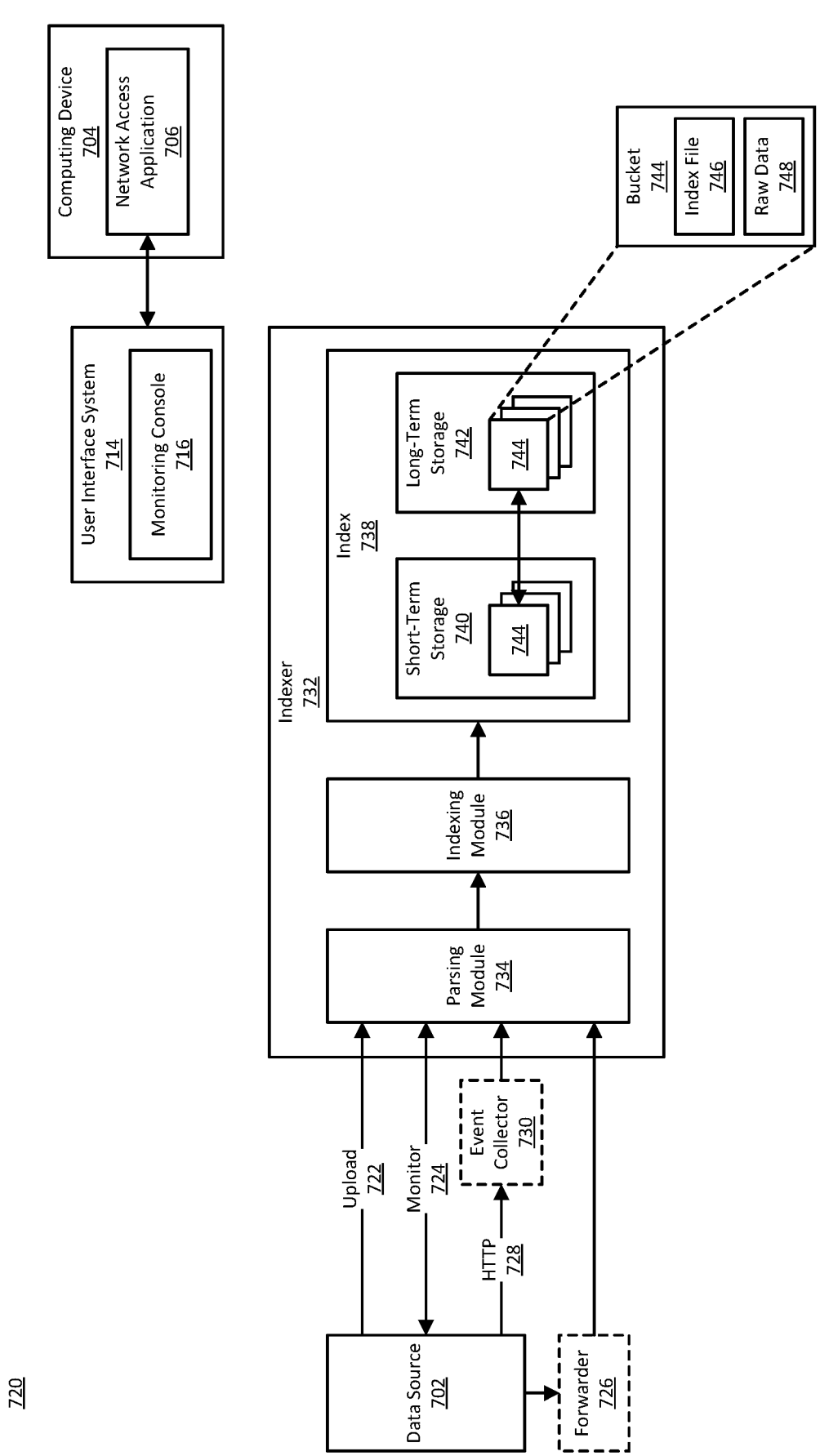
FIG. 7 is a block diagram illustrating in greater detail an example of an indexing system of a data intake and query system according to some examples.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for indexing; configuring the indexer 732 to index the data from the data source 702; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can instruct the indexing system to specify a file for uploading into the indexer 732. For example, the monitoring console 716 can include commands or an interface through which the user can specify where the file is located (e.g., on which computing device and/or in which directory of a file system) and the name of the file. Once uploading is initiated, the indexer 732 processes the file, as discussed further below. Uploading is a manual process and occurs when instigated by a user. For automated data ingestion, the other ingestion methods are used.

The monitor 724 method enables the indexing system to monitor the data source 702 and continuously or periodically obtain data produced by the data source 702 for ingestion by the indexer 732. For example, using the monitoring console 716, a user can specify a file or directory for monitoring. In this example, the indexing system can execute a monitoring process that detects whenever data is added to the file or directory and causes the data to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events or event data to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated to facilitate discussion, with the understanding that implementations with other components are possible to achieve the same functionality.

The parsing module 734 determines information about event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field or using machine learning.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing module 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can include more than one index and can include indexes of different types. For example, the indexer 732 can include event indexes, which impose minimal structure on stored data and can accommodate any type of data. As another example, the indexer 732 can include metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing module 734 may add fields to event data and/or perform transformations on fields in the event data, and thus a raw data file 748 can include, in addition to or instead of raw data, what is referred to herein as enriched raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data in the raw data file 748 with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may move from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the indexer 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
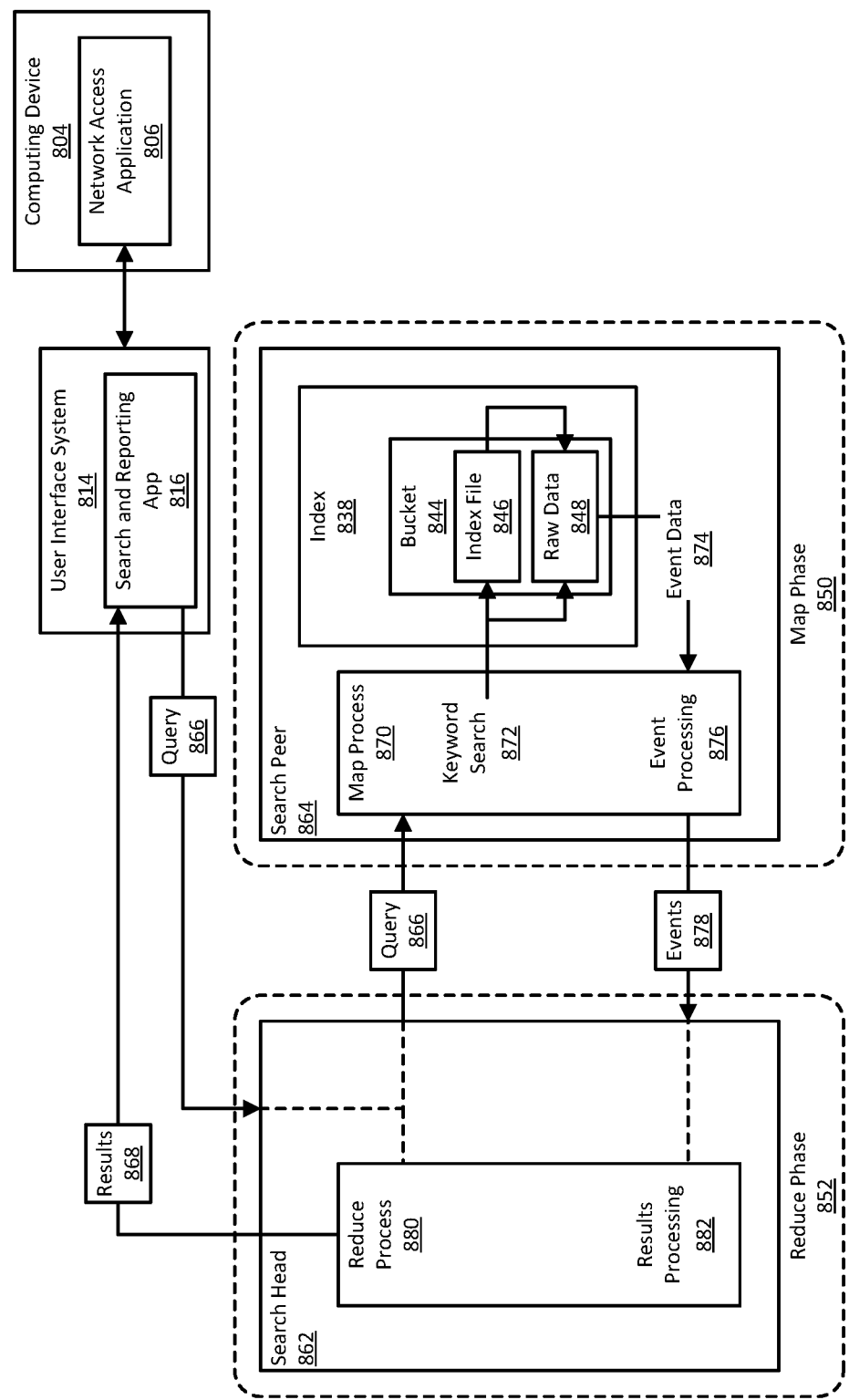
FIG. 8 is a block diagram illustrating in greater detail an example of the search system of a data intake and query system according to some examples.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("|" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search using search terms specified in the search query 866. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data 874 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the events. The results processing 882 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

Through results processing 882, the reduce process 880 produces the events found by processing the search query 866, as well as some information about the events, which the search head 862 outputs to the search and reporting app 816 as search results 868. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Choropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 868. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 9:
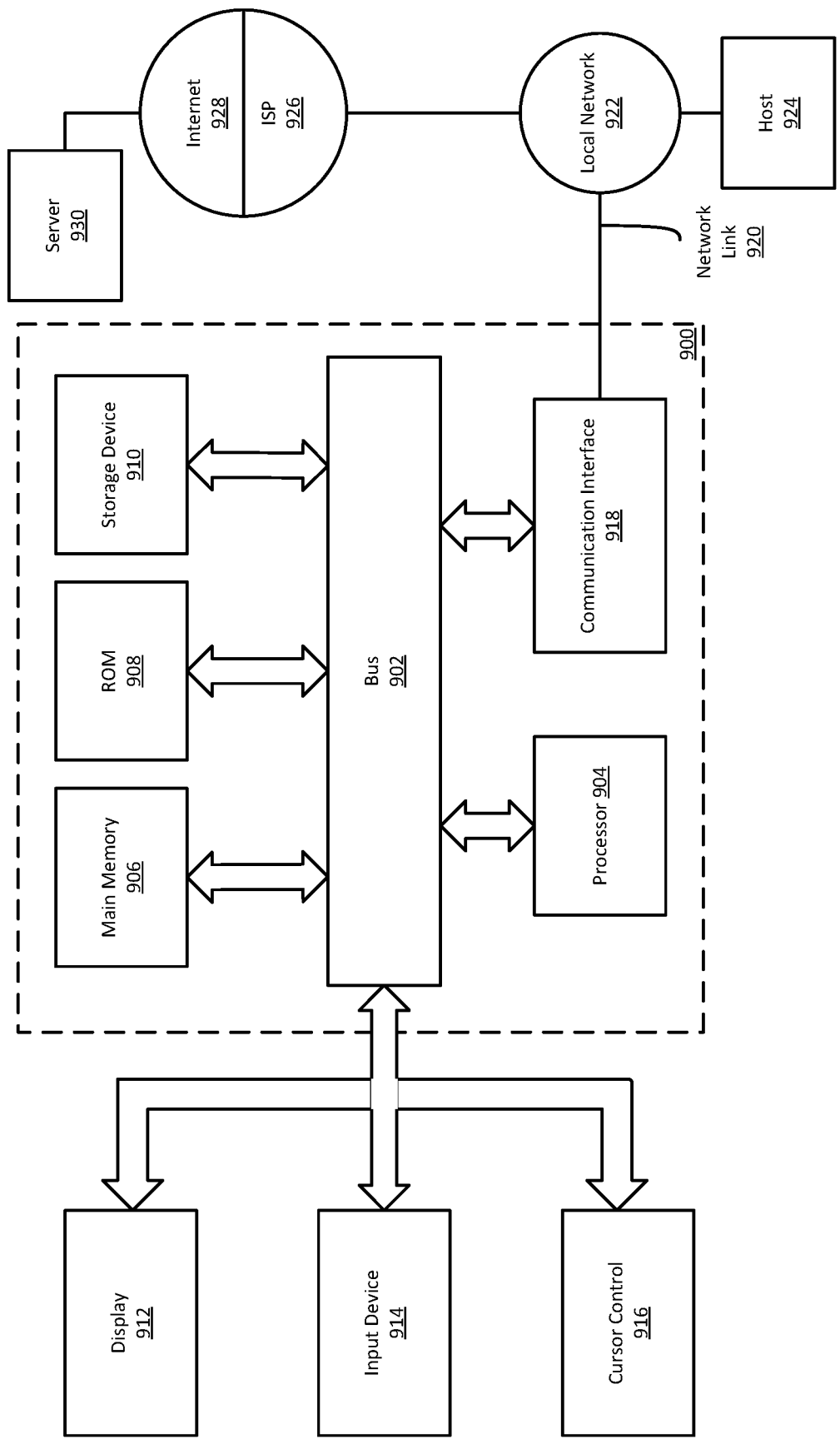
FIG. 9 is a block diagram illustrating an example computer system that may be used in some embodiments.

FIG. 9 is a block diagram that illustrates a computer system 900 utilized in implementing the above-described techniques, according to an example. Computer system 900 may be, for example, a desktop computing device, laptop computing device, tablet, smartphone, server appliance, computing mainframe, multimedia device, handheld device, networking apparatus, or any other suitable device.

Computer system 900 includes one or more buses 902 or other communication mechanism for communicating information, and one or more hardware processors 904 coupled with buses 902 for processing information. Hardware processors 904 may be, for example, general purpose microprocessors. Buses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes a main memory 906, such as a random access memory (RAM) or other dynamic or volatile storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 a special-purpose machine that is customized to perform the operations specified in the instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, is provided and coupled to bus 902 for storing information and instructions.

Computer system 900 may be coupled via bus 902 to one or more displays 912 for presenting information to a computer user. For instance, computer system 900 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 912.

One or more input devices 914 are coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an example, a network-based input device 914 may be utilized. In such an example, user input and/or other information or commands may be relayed via routers and/or switches on a Local Area Network (LAN) or other suitable shared network, or via a peer-to-peer network, from the input device 914 to a network link 920 on the computer system 900.

A computer system 900 may implement techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In other examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

A computer system 900 may also include, in an example, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 802.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the world-wide packet data communication network now commonly referred to as the "internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

In an example, computer system 900 can send messages and receive data, including program code and/or other types of instructions, through the network(s), network link 920, and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

In some examples, some or all of the systems described herein may be or comprise server computer systems, including one or more computer systems 900 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such examples may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective examples may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some examples, the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   receiving, by a first ingestion endpoint of a data intake and query system, a message associated with a data source located in a computing environment, wherein the message includes machine data reflecting activity of a computing resource in the computing environment, and wherein a copy of the message is received by at least two ingestion endpoints of a plurality of ingestion endpoints including the first ingestion endpoint;
   requesting to store the message or an identifier of the message in a data store, wherein the request to store the message or the identifier of the message in the data store succeeds if the message or the identifier of the message does not exist in the data store;
   responsive to determining that the message or the identifier of the message was successfully stored in the data store, causing the message to be processed by a data intake and query system;
   receiving, by a second ingestion endpoint, a copy of the message including the machine data;
   requesting, by the second ingestion endpoint, to store the copy of the message or an identifier of the message in the data store; and
   responsive to determining that the data store denied storage of the copy of the message or the identifier of the message, causing the second ingestion endpoint to discard the copy of the message.

2. The method of claim 1, further comprising:
   determining that a change has occurred to the plurality of ingestion endpoints, wherein the change includes at least one of: removal of an ingestion endpoint from the plurality of ingestion endpoints, addition of an ingestion endpoint to the plurality of ingestion endpoints, reassignment of an ingestion endpoint of the plurality of ingestion endpoints to a shard of a plurality of shards, or modification of a type of machine data supported by an ingestion endpoint of the plurality of ingestion endpoints; and providing, to the data source, updated ingestion endpoint information indicating the change to the plurality of ingestion endpoints.

3. The method of claim 1, further comprising sending, to the data source, identifiers of the plurality of ingestion endpoints, wherein the plurality of ingestion endpoints are provisioned for a user account associated with the data source.

4. The method of claim 1, wherein the data store is a message queue that preserves an ordering of messages based on a timestamp associated with each message.

5. The method of claim 1, wherein the message is sent by a data forwarding component installed in the computing environment, wherein the data forwarding component generates the message by storing as part of the message: the machine data, a timestamp, and a hash value calculated based on at least a portion of the message.

6. The method of claim 1, wherein causing the message to be processed by the data intake and query system includes generating an event based on the machine data contained in the message and indexing the event.

7. The method of claim 1, wherein the first ingestion endpoint is part of an indexer of the data intake and query system, and wherein the indexer processes the message in part by generating an event based on the machine data contained in the message and indexing the event.

8. The method of claim 1, further comprising:
receiving, from the data source, a request for information about the plurality of ingestion endpoints, wherein the request includes authentication information identifying a user account associated with the data source;
identifying the plurality of ingestion endpoints based at least in part on the authentication information; and
sending, to the data source, information identifying the plurality of ingestion endpoints.

9. The method of claim 1, wherein each ingestion endpoint of the plurality of ingestion endpoints is associated with a unique Internet Protocol (IP) address or Domain Name System (DNS) name, and wherein the data source sends the message to the first ingestion endpoint using the unique IP address or DNS name of the first ingestion endpoint.

10. The method of claim 1, wherein copies of the message are generated by one or more networking devices using a multicast-based network protocol, wherein the one or more networking devices are located in a network path between the data source and the first ingestion endpoint.

11. The method of claim 1, further comprising grouping the plurality of ingestion endpoints into a plurality of shards, wherein the data source sends a copy of the message to at least one ingestion endpoint associated with each shard of the plurality of shards.

12. The method of claim 1, further comprising grouping the plurality of ingestion endpoints into a plurality of shards, wherein the plurality of shards are distributed across two or more availability zones of a cloud provider network.

13. The method of claim 1, further comprising provisioning, by the data intake and query system, the plurality of ingestion endpoints in association with an account of the data intake and query system, wherein the data source is associated with the account of the data intake and query system.

14. The method of claim 1, wherein the first ingestion endpoint is associated with a type of machine data supported by the first ingestion endpoint, and wherein the data source sends the message to the first ingestion endpoint based at least in part on a determination that the machine data is associated with the type of machine data supported by the first ingestion endpoint.

15. A computing device, comprising:
a processor; and
a non-transitory computer-readable medium having stored thereon instructions that, when executed by the processor, cause the processor to perform operations including:
receiving, by a first ingestion endpoint of a data intake and query system, a message associated with a data source located in a computing environment, wherein the message includes machine data reflecting activity of a computing resource in the computing environment, and wherein a copy of the message is received by at least two ingestion endpoints of a plurality of ingestion endpoints including the first ingestion endpoint;
requesting to store the message or an identifier of the message in a data store, wherein the request to store the message or the identifier of the message in the data store succeeds if the message or the identifier of the message does not exist in the data store;
responsive to determining that the message or the identifier of the message was successfully stored in the data store, causing the message to be processed by a data intake and query system;
receiving, by a second ingestion endpoint, a copy of the message including the machine data;
requesting, by the second ingestion endpoint, to store the copy of the message or an identifier of the message in the data store; and
responsive to determining that the data store denied storage of the copy of the message or the identifier of the message, causing the second ingestion endpoint to discard the copy of the message.

16. The computing device of claim 15, wherein the instructions, when executed by the processor, further cause the processor to perform operations including:
determining that a change has occurred to the plurality of ingestion endpoints, wherein the change includes at least one of: removal of an ingestion endpoint from the plurality of ingestion endpoints, addition of an ingestion endpoint to the plurality of ingestion endpoints, reassignment of an ingestion endpoint of the plurality of ingestion endpoints to a shard of a plurality of shards, or modification of a type of machine data supported by an ingestion endpoint of the plurality of ingestion endpoints; and
providing, to the data source, updated ingestion endpoint information indicating the change to the plurality of ingestion endpoints.

17. The computing device of claim 15, wherein the data store is a message queue that preserves an ordering of messages based on a timestamp associated with each message.

18. The computing device of claim 15, wherein causing the message to be processed by the data intake and query system includes generating an event based on the machine data contained in the message and indexing the event.

19. A non-transitory computer-readable medium having stored thereon instructions that, when executed by one or more processors, cause the one or more processors to perform operations including:

- receiving, by a first ingestion endpoint of a data intake and query system, a message associated with a data source located in a computing environment, wherein the message includes machine data reflecting activity of a computing resource in the computing environment, and wherein a copy of the message is received by at least two ingestion endpoints of a plurality of ingestion endpoints including the first ingestion endpoint;
- requesting to store the message or an identifier of the message in a data store, wherein the request to store the message or the identifier of the message in the data store succeeds if the message or the identifier of the message does not exist in the data store;
- responsive to determining that the message or the identifier of the message was successfully stored in the data store, causing the message to be processed by a data intake and query system;
- receiving, by a second ingestion endpoint, a copy of the message including the machine data;
- requesting, by the second ingestion endpoint, to store the copy of the message or an identifier of the message in the data store; and
- responsive to determining that the data store denied storage of the copy of the message or the identifier of the message, causing the second ingestion endpoint to discard the copy of the message.

20. The non-transitory computer-readable medium of claim 19, wherein the data store is a message queue that preserves an ordering of messages based on a timestamp associated with each message.

\* \* \* \* \*